(12) United States Patent
Krah

(10) Patent No.: US 8,035,481 B2
(45) Date of Patent: Oct. 11, 2011

(54) ILLUMINABLE LATCH

(75) Inventor: Christoph H. Krah, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/499,691

(22) Filed: Jul. 8, 2009

(65) Prior Publication Data
US 2009/0268401 A1    Oct. 29, 2009

Related U.S. Application Data

(63) Continuation of application No. 11/498,451, filed on Aug. 2, 2006, now Pat. No. 7,570,485, which is a continuation of application No. 10/800,166, filed on Mar. 12, 2004, now Pat. No. 7,126,816.

(51) Int. Cl.
*G08B 5/22* (2006.01)
*H04Q 1/30* (2006.01)

(52) U.S. Cl. ............... 340/7.58; 340/7.61; 340/7.51; 362/23

(58) Field of Classification Search ............ 340/7.58, 340/7.61, 7.51; 250/239; 361/683; 345/157, 345/83, 88; 362/23, 84, 572; 607/88, 89
See application file for complete search history.

(56) References Cited

U.S. PATENT DOCUMENTS

| | | |
|---|---|---|
| 3,836,982 A | 9/1974 | Schwartz |
| 5,534,914 A | 7/1996 | Flohr et al. |
| 5,548,478 A | 8/1996 | Kumar et al. |
| D374,022 S | 9/1996 | Meinzer |
| 5,583,565 A | 12/1996 | Cortjens et al. |
| 5,589,878 A | 12/1996 | Cortjens et al. |
| 5,598,209 A | 1/1997 | Cortjens et al. |
| D395,440 S | 6/1998 | Ogasawara et al. |
| 5,768,163 A * | 6/1998 | Smith, II ............ 708/105 |
| 5,778,082 A | 7/1998 | Chu et al. |
| 5,801,919 A | 9/1998 | Griencewic |
| 5,821,922 A | 10/1998 | Sellers |
| 5,855,343 A | 1/1999 | Krekelberg |
| 5,860,015 A * | 1/1999 | Olson ............ 713/300 |

(Continued)

FOREIGN PATENT DOCUMENTS

EP    0781049 A2    6/1997

(Continued)

OTHER PUBLICATIONS

Notice of Allowance dated Apr. 3, 2009 in U.S. Appl. No. 11/498,451.

(Continued)

*Primary Examiner* — Nam V Nguyen
(74) *Attorney, Agent, or Firm* — Beyer Law Group LLP

(57) ABSTRACT

A computing device is disclosed. The computing device includes a data capture device such as a camera. In one aspect, the data capture device may integrated with the housing of the computing device and further detachable therefrom. In another aspect, the data capture device may swivel and/or translate relative to the housing of the computing device. In another aspect, the computing device may include a positioning device for controlling the movement of the data capture device relative to the housing. In yet another aspect, the computing device may include a latch that is automatically positioned in a home position when a housing component of the computing device is positioned in first position, and is automatically positioned in a lock position when the housing component of the computing device is positioned in a closed position.

19 Claims, 8 Drawing Sheets

U.S. PATENT DOCUMENTS

| | | | |
|---|---|---|---|
| 5,900,907 A | 5/1999 | Malloy et al. | |
| 5,999,207 A | 12/1999 | Rodriguez et al. | |
| 6,094,213 A | 7/2000 | Mun et al. | |
| 6,118,653 A | 9/2000 | Kim | |
| 6,163,335 A | 12/2000 | Barraclough | |
| 6,172,703 B1 | 1/2001 | Lee | |
| D438,221 S | 2/2001 | Hedrick et al. | |
| D439,588 S | 3/2001 | Bergstrom et al. | |
| 6,243,819 B1 | 6/2001 | Jung | |
| 6,275,258 B1 | 8/2001 | Chim | |
| 6,326,735 B1 * | 12/2001 | Wang et al. | 315/169.3 |
| 6,347,882 B1 * | 2/2002 | Vrudny et al. | 362/561 |
| D454,898 S | 3/2002 | Ogasawara et al. | |
| 6,411,505 B1 | 6/2002 | DiFonzo et al. | |
| D463,467 S | 9/2002 | Sumita | |
| 6,448,955 B1 * | 9/2002 | Evanicky et al. | 345/102 |
| 6,453,336 B1 | 9/2002 | Beyda et al. | |
| 6,462,937 B1 | 10/2002 | Liao et al. | |
| 6,466,252 B1 | 10/2002 | Miyazaki | |
| 6,469,732 B1 | 10/2002 | Chang et al. | |
| 6,480,373 B1 | 11/2002 | Landry et al. | |
| 6,484,156 B1 | 11/2002 | Gupta et al. | |
| 6,489,986 B1 | 12/2002 | Allen | |
| 6,496,361 B2 | 12/2002 | Kim et al. | |
| D471,218 S | 3/2003 | Sekine | |
| D476,345 S | 6/2003 | Phelps et al. | |
| D477,622 S | 7/2003 | Phelps et al. | |
| 6,587,151 B1 | 7/2003 | Cipolla et al. | |
| D482,377 S | 11/2003 | Tajima | |
| 6,659,516 B2 | 12/2003 | Wang et al. | |
| 6,693,663 B1 | 2/2004 | Harris | |
| 6,731,324 B2 | 5/2004 | Levy | |
| 6,771,396 B1 | 8/2004 | Cheatle et al. | |
| 6,784,916 B2 | 8/2004 | Smith | |
| 6,788,529 B2 | 9/2004 | Homer et al. | |
| 7,061,536 B2 | 6/2006 | Cha | |
| 7,126,816 B2 | 10/2006 | Krah | |
| 7,170,551 B2 | 1/2007 | Fichtner | |
| 7,570,485 B2 * | 8/2009 | Krah | 361/679.23 |
| 2001/0009439 A1 | 7/2001 | Hwang | |
| 2001/0018349 A1 | 8/2001 | Kinnuen et al. | |
| 2001/0056460 A1 | 12/2001 | Sahota et al. | |
| 2002/0044201 A1 | 4/2002 | Alexander et al. | |
| 2002/0057347 A1 | 5/2002 | Urisaka et al. | |
| 2002/0149672 A1 | 10/2002 | Clapp et al. | |
| 2002/0198962 A1 | 12/2002 | Horn et al. | |
| 2003/0161093 A1 | 8/2003 | Lam et al. | |
| 2004/0017938 A1 | 1/2004 | Cooper et al. | |
| 2004/0257431 A1 | 12/2004 | Girish et al. | |
| 2004/0257432 A1 | 12/2004 | Girish et al. | |
| 2005/0128284 A1 | 6/2005 | Hoffer et al. | |
| 2005/0168924 A1 | 8/2005 | Wu et al. | |

FOREIGN PATENT DOCUMENTS

| | | |
|---|---|---|
| JP | 03190139 | 7/1991 |
| JP | 405037836 A | 2/1993 |
| JP | 08238627 | 8/1996 |
| JP | 410073754 A | 3/1998 |
| JP | 11111690 | 4/1999 |
| JP | 2000-092356 | 3/2000 |
| JP | 02000307913 | 11/2000 |
| JP | 2002/238040 | 8/2002 |
| JP | 2002-238040 | 8/2002 |
| WO | 99/60788 | 11/1999 |

OTHER PUBLICATIONS

Notice of Allowance dated Apr. 16, 2009 in U.S. Appl. No. 10/651,918.
Office Action dated Nov. 28, 2008 in U.S. Appl. No. 10/651,918.
Office Action dated Sep. 25, 2007 in U.S. Appl. No. 10/651,918.
Office Action dated Mar. 8, 2007 in U.S. Appl. No. 10/651,918.
Notice of Allowance dated Feb. 22, 2008 in U.S. Appl. No. 10/652,157.
Office Action dated Mar. 30, 2007 in U.S. Appl. No. 11/498,451.
Office Action dated Sep. 5, 2008 in U.S. Appl. No. 11/498,451.
Office Action dated Aug. 27, 2007in U.S. Appl. No. 10/652,157.
Office Action dated Jan. 8, 2007 in U.S. Appl. No. 10/652,157.
Office Action dated Sep. 8, 2006 in U.S. Appl. No. 10/652,157.
Office Action dated Mar. 29, 2009 in U.S. Appl. No. 10/652,157.
Office Action dated Oct. 4, 2005 in U.S. Appl. No. 10/652,157.
Proshare® Video Conferencing System, Cisco Whitepaper, Cisco Systems, Inc., http://www.intel.com/support/proshare/8161.htm, downloaded Jun. 24, 2003, pp. 1-10.
Computers/Input Devices/Web Cameras; www.shopping.com, downloaded on Apr. 7, 2004.
International Search Report dated Nov. 16, 2004 in PCT Application No. PCT/US2004/016635.
Written Opinion dated Nov. 16, 2004 in PCT Application No. PCT/US2004/016635.
Sony VAIO C1MV Picturebook with TM5800 Crusoe: http://www.pcstats.com/articleview.cfm?articleID=857; downloaded on Oct. 15, 2004.
Office Action dated Nov. 16, 2007 in U.S. Appl. No. 11/498,451.
Office Action dated Feb. 26, 2008 in U.S. Appl. No. 11/498,451.
International Search Report dated Nov. 15, 2005 in PCT Application No. PCT/US04/15916.
Written Opinion dated Nov. 15, 2005 in PCT Application No. PCT/US04/15916.

* cited by examiner

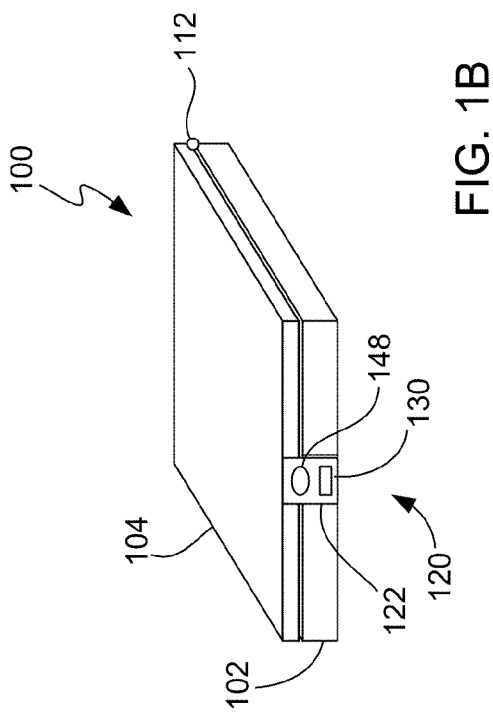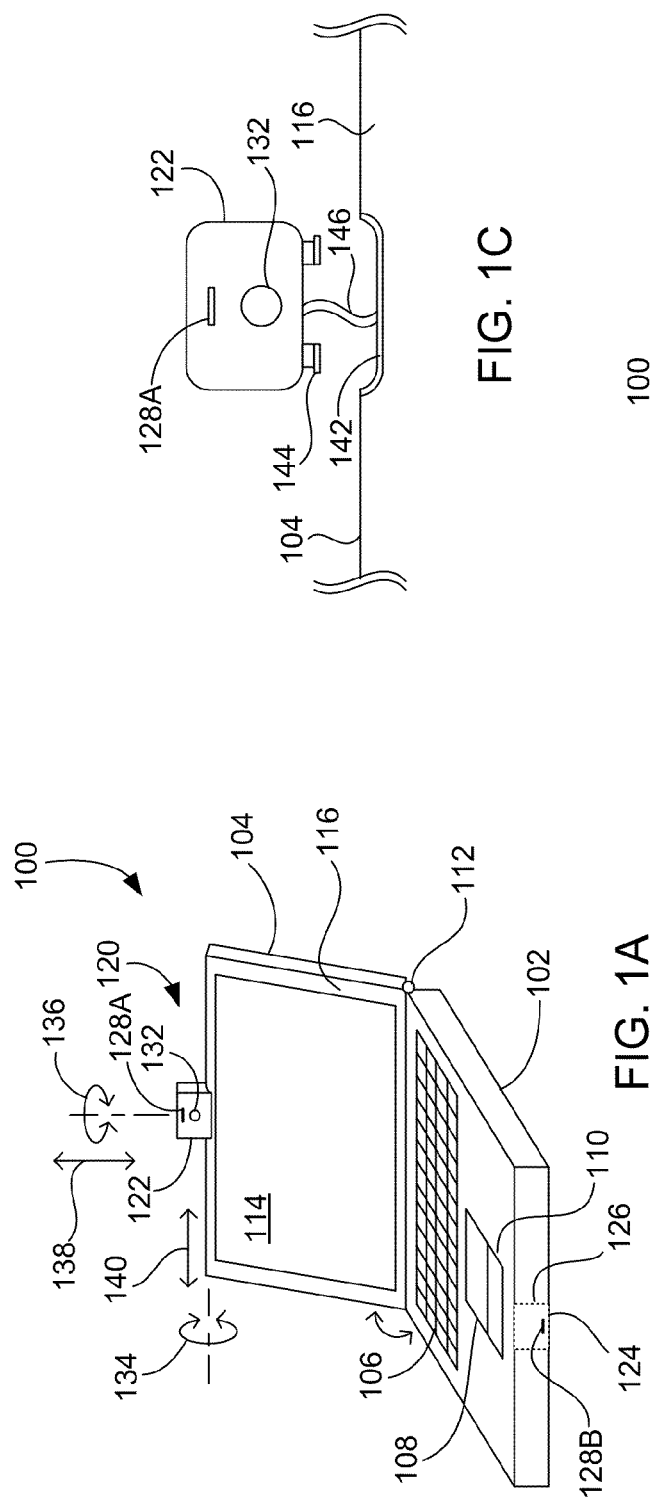

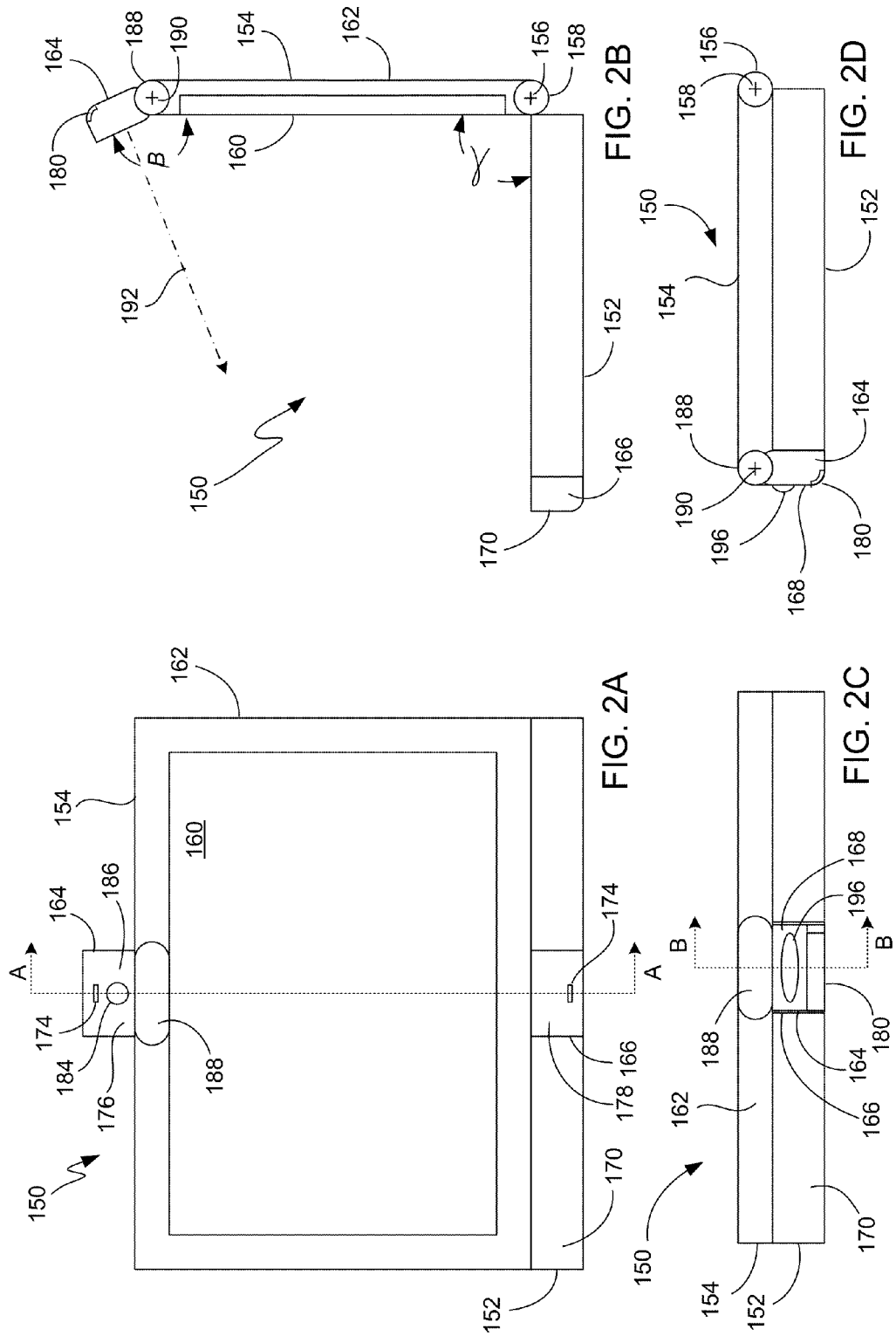

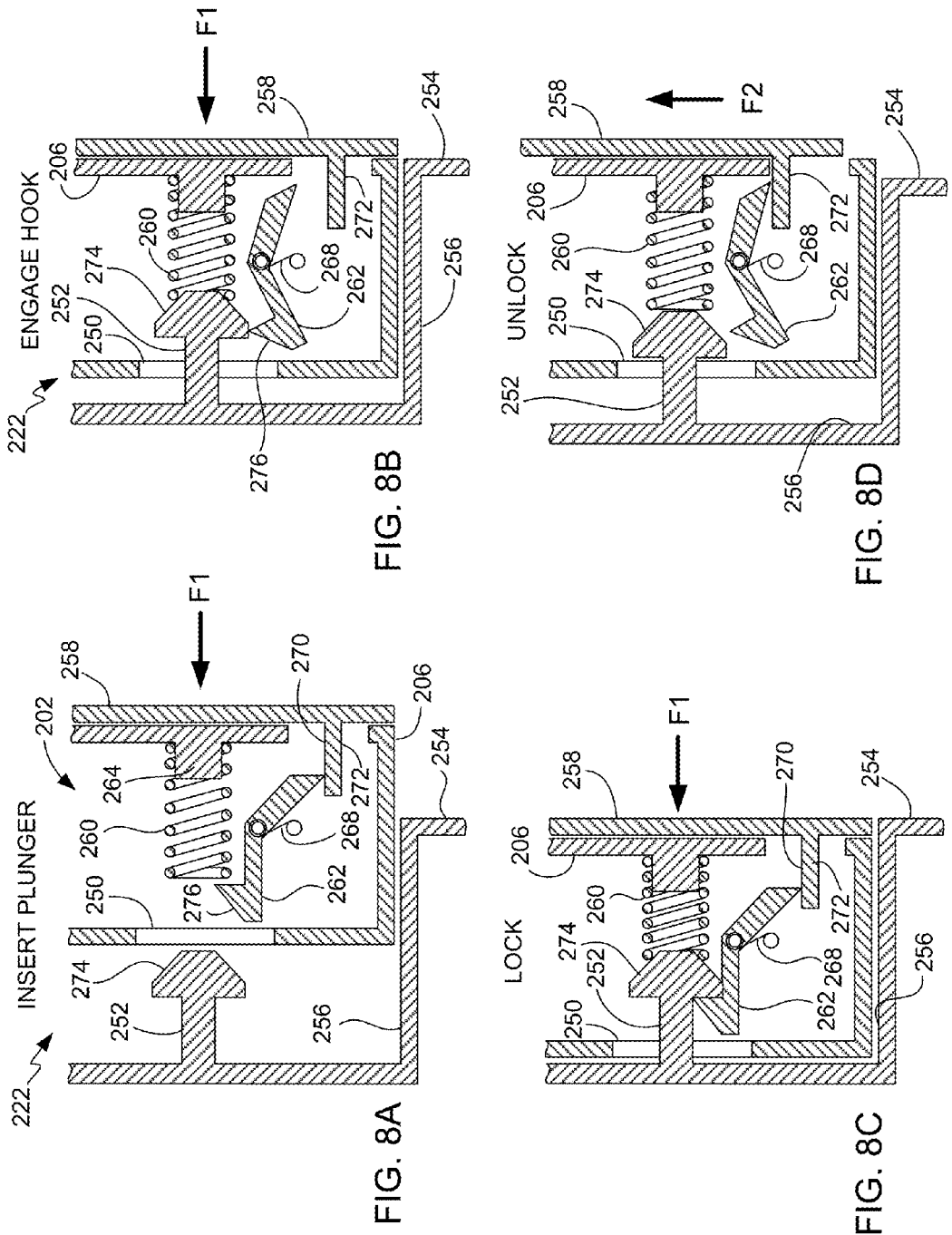

ILLUMINABLE LATCH

CROSS REFERENCE TO RELATED APPLICATIONS

This application is a continuation of U.S. patent application Ser. No. 11/498,451, titled "CAMERA LATCH," filed Aug. 2, 2006 (now U.S. Pat. No. 7,570,485), which is a continuation of U.S. patent application Ser. No. 10/800,166, titled "CAMERA LATCH," filed Mar. 12, 2004 (now U.S. Pat. No. 7,126,816), which are hereby incorporated by reference herein.

This application is also related to U.S. patent application Ser. No. 10/652,157, titled "VIDEO CONFERENCING APPARATUS AND METHOD," filed Aug. 29, 2003 and U.S. patent application Ser. No. 10/651,918, titled "VIDEO CONFERENCING SYSTEM HAVING FOCUS CONTROL," filed Aug. 29, 2003, which are hereby incorporated by reference herein

BACKGROUND OF THE INVENTION

1. Field of the Invention

The invention generally pertains to a laptop computer and more particularly to a camera latch that is incorporated into a laptop computer.

2. Description of the Related Art

Laptop computers generally consist of a lid for housing a display screen such as an LCD and a base for housing various operational components such as a processor, a hard drive, a disk drive, a modem, a battery, etc. The base also typically carries several input devices including a keyboard, a track pad (or track stick), and various buttons. In most cases, the lid is hinged to the base so as to move the lid between a closed position, placing the lid against the base, and an open position, exposing the display screen and the input devices to the user.

Most portable computers require that the lid be securely attached to the base for transportation. As such, a locking mechanism is generally provided to secure the lid to the base when the lid is in the closed position. The locking mechanism typically includes a hook, which extends from the lid and which is configured for lockably engaging the base when the lid is in the closed position. The locking mechanism may also include a slide knob for slidably releasing the hook from the base so as to place the lid in the open position.

Various peripheral input output devices may be electrically connected to the laptop computer. The peripheral I/O devices may include memory, disk drives, keyboards, monitors, mice, printers, scanners, speakers and digital cameras. In most cases, the peripheral I/O devices are connected to laptop computer through wired connections using a serial, USB, or Firewire interface. In other cases, the peripheral I/O devices (as for example keyboards and mice) are connected to the laptop through wireless connections such as radio or Bluetooth.

Digital cameras, in particular, have become increasingly popular input devices. The digital camera records images in digital form and feeds the images to the laptop computer. The images may be downloaded into the laptop computer as they are recorded or they may be stored in the digital camera for downloading at a later time. Once in the computer, the images can be edited, copied, emailed, broadcasted, etc. Some examples of digital cameras include webcams, point and click cameras and camcorders. In all of these examples, the digital camera includes a sensor that converts light into electrical charges. The image sensor employed by most digital cameras is a charge coupled device (CCD), although complimentary metal oxide semiconductor (CMOS) may also be used.

Digital cameras and more particularly webcams, whose output is primarily available for viewing over the Internet, may also be configured for video conferencing. Video conferencing generally refers to a live connection between two or more participants in separate locations for the purpose of audio and video communication. At its simplest, videoconferencing provides transmission of images and text between two locations. At its most sophisticated, it provides transmission of full motion video images and high quality audio between two or more locations.

Although current laptop designs work well, in many instances it would be desirable to provide laptops with improved and/or additional functionality while maintaining aesthetics and keeping with the current trend of smaller and more powerful laptops.

SUMMARY OF THE INVENTION

The invention relates, in one embodiment, to a portable computer. The portable computer includes a base. The portable computer also includes a lid that pivots relative to the base. The portable computer further includes a latch configured to secure the lid to the base. The latch includes a data capture device such as a camera.

The invention relates, in another embodiment, to a laptop computer. The laptop computer includes a base containing a processor. The laptop computer also includes a lid pivotally coupled to the base. The lid contains a display operatively coupled the processor. The laptop computer further includes a latch pivotally coupled to the lid. The latch contains an electronic feature operatively coupled to the processor and a locking feature for lockably engaging the base.

The invention relates, in another embodiment, to a monitor. The monitor includes a display housing. The monitor also includes a display coupled to the display housing. The monitor also includes a camera coupled to the display housing.

The invention relates, in another embodiment, to a computing device. The computing device includes a housing of a computing device. The computing device also includes a detachable data capture module that is integrated with the housing of the computing device. The detachable data capture module includes a data capture device. The data capture device captures data when the data capture module is coupled to the housing of the computing device and when the data capture module is decoupled from the housing of the computing device.

The invention relates, in another embodiment, to a portable computer. The portable computer includes a base. The portable computer also includes a lid that pivots relative to the base. The portable computer also includes a data capture module movably attached to the lid and including a data capture device. The movement of the data capture module relative to the lid including at least one of a swivel and a translation.

The invention relates, in another embodiment, to a portable computer. The portable computer includes a base. The portable computer also includes a lid that pivots relative to the base. The lid moves between a closed position and an open position. The portable computer additionally includes a data capture module that automatically moves to an operable position from an inoperable position when the lid is moved from the closed position to the open position. The data capture module includes a data capture device.

The invention relates, in another embodiment, to a portable computer. The portable computer includes a base containing a processor. The portable computer also includes a lid pivotally coupled to the base. The lid contains a display operatively coupled the processor. The lid further includes a latch pivotally coupled to the lid. The latch contains a locking feature for lockably engaging the base. The latch is automatically positioned in a home position when the lid is positioned in an open position, and the latch is automatically positioned in a lock position when the lid is positioned in a closed position.

The invention relates, in another embodiment, to a portable computer. The portable computer includes a base containing a processor. The portable computer also includes a lid pivotally coupled to the base. The lid contains a display operatively coupled the processor. The portable computer further includes a data capture module movably coupled to the lid. The data capture device includes a data capture device. The portable computer additionally includes a positioning device for controlling the movement of the data capture module relative to the lid.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a perspective view of a portable computer in an open position, in accordance with one embodiment of the invention.

FIG. 1B is a perspective view of a portable computer in closed position, in accordance with one embodiment of the invention.

FIG. 1C is a front elevation view of a detachable latch, in accordance with one embodiment of the invention.

FIG. 2A is a front view of laptop computer in an open position, in accordance with one embodiment of the present invention.

FIG. 2B is a side view of laptop computer in an open position, in accordance with one embodiment of the present invention.

FIG. 2C is a front view of laptop computer in a closed position, in accordance with one embodiment of the present invention.

FIG. 2D is a side view of laptop computer in a closed position, in accordance with one embodiment of the present invention.

FIG. 8A is top view of a locking mechanism, in accordance with one embodiment of the present invention.

FIG. 8B is top view of a locking mechanism, in accordance with one embodiment of the present invention.

FIG. 8C is top view of a locking mechanism, in accordance with one embodiment of the present invention.

FIG. 8D is top view of a locking mechanism, in accordance with one embodiment of the present invention.

DETAILED DESCRIPTION OF THE INVENTION

Figures 3, 4:
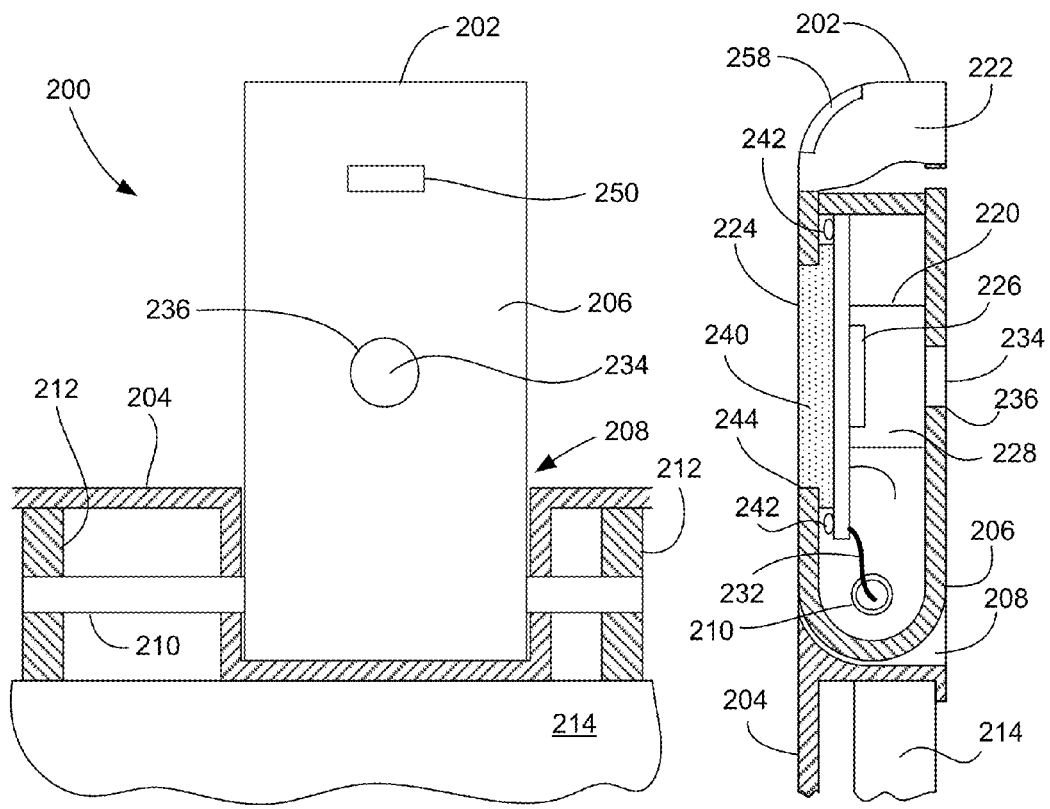
FIG. 3 is a front view, in partially cross section, of a lid side latch assembly, in accordance with one embodiment of the present invention.
FIG. 4 is a side view, in partially cross section, of a lid side latch assembly, in accordance with one embodiment of the present invention.
Figures 5, 6:
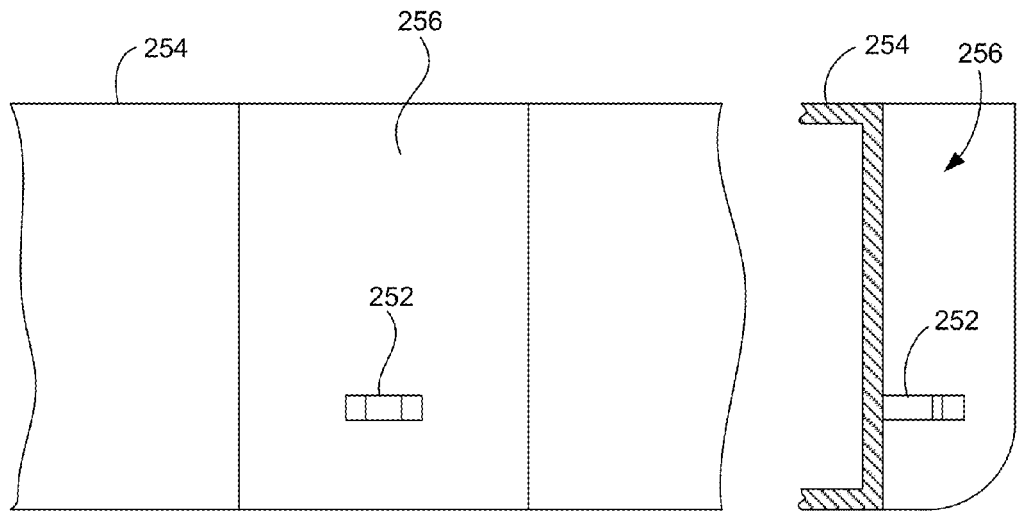
FIG. 5 is a front view, in partially cross section, of a base side latch assembly, in accordance with one embodiment of the present invention.
FIG. 6 is a side view, in partially cross section, of a base side latch assembly, in accordance with one embodiment of the present invention.

Embodiments of the invention are discussed below with reference to FIGS. 1-11. However, those skilled in the art will readily appreciate that the detailed description given herein with respect to these figures is for explanatory purposes as the invention extends beyond these limited embodiments.

FIG. 1 is a perspective diagram of a portable computer 100, in accordance with one embodiment of the invention. The portable computer 100 generally includes a base 102 and a lid 104. The base 102 is configured to enclose various integrated circuit chips and other circuitry that provide computing operations for the portable computer 100. By way of example, the integrated circuit chips and other circuitry may include a microprocessor, Read-Only Memory (ROM), Random-Access Memory (RAM), a disk drive, a battery, and various input/output support devices. The base 102 is also arranged to hold a plurality of input devices such as a keyboard 106, a track pad 108 and button(s) 110.

The lid 104 is pivotally mounted to the base 102 via a hinge mechanism 112. As such, the lid 104 may rotate to various positions between an open position (FIG. 1A) and a closed position (FIG. 1B) relative to the base 102. The lid 104 generally contains a liquid crystal display (LCD) 114 that is used to display the graphical user interface (including perhaps a pointer or cursor) as well as other information to the user. The LCD display 114 is generally surrounded at a peripheral region by a bezel 116 that serves to support the LCD display 114 in its assembled position within the lid 104.

The hinge mechanism 112 generally allows the lid 104 to pivot relative to the base 102 so as to adjust the orientation of the lid 104 relative to the base 102. For example, the lid 104 may rotate between an open position and a closed position. In general, the open position corresponds to a lid orientation that allows a user to use the portable computer, i.e., the LCD display 114 and input devices 106-110 are visible and accessible to a user, and the closed position corresponds to a lid orientation that allows a user to store or transport the portable computer, i.e., the base and lid are substantially flush with one another such that the LCD 114 and the input devices 106-110 are no longer visible or accessible to a user.

In most cases, the hinge mechanism 112 is configured to hold the lid 104 in its desired position (e.g., open, partially open or closed). The hinge mechanism 112 may for example include a brake configured for exerting a frictional force on the lid 104 so as to maintain the position of the lid 104 when the lid 104 is moved to the desired position. By way of example, a cam may be used to create the frictional force. In general, the cam moves between an engagement position, preventing the lid from slipping out of position, and a release position, allowing the lid to freely rotate around the pivot. Other braking features may also be used as for example, friction washers, gears etc.

A locking mechanism 120 is also provided for securing the lid 104 to the base 102 when the lid 104 is in the closed position. The locking mechanism 120 generally includes a latch 122 that is received by a latch receiving area 124 of the base 102 when the lid 104 is placed in the closed position. The latch 122 and the latch receiving area 124 are cooperatively positioned so that when the lid 104 is closed, the two elements engage with one another thus securing the lid 104 to the base 102. As shown, the latch 122 protrudes from a top portion of the bezel 116 (above the LCD 114) and the latch receiving area 124 is located in the front portion of the base 102 (in front of the track pad 108).

The latch 122 and latch receiving area 124 can be widely varied. For example, the latch 122 may be fixed to the bezel 116 or it may be movably coupled thereto so that it can be more easily positioned next to the latch receiving area 124. The latch 122 may for example be pivotally coupled to the bezel 116 so that it can rotate into engagement with the latch receiving area 124. Furthermore, the latch receiving area 124 may correspond to the outer front surface of the base 102 or it may correspond to a cut out 126 in the base 102. The cut out 126 is generally configured to receive the latch 122 therein. The cut out 126 may be used to place the back surface of the latch flush with the outer front surface of the base 102 when the lid 104 is in the closed position. By way of example, the cut out 126 may be a channel that runs through the entire front surface of the base 102 or it may be a recess that only runs partially through the front surface of the base 102. In either case, the cutout 126 is set to receive the latch 122 when the lid 104 is closed. The shape of the cut out 126 generally corresponds to the shape of the latch 122. This is typically done to eliminate voids or substantial breaks between the edges the latch 122 and cut out 126 when the latch 122 is mated within the cut out 126. The shapes may for example include ovals, rectangles, squares, circles, etc or other complex shapes.

In one embodiment, the latch 122 and latch receiving area 124 include locking features 128A an 128B that are cooperatively positioned so that when the latch 122 is positioned next to the latch receiving area 124, the locking features 128 lockably engage with one another thus securing the latch 122 to the base 102. The locking features 128 may be widely varied, and may for example include catches, plungers, hooks, flanges, slots, guides, and the like. In order to allow the lid 104 to be opened, the latch 122 or latch receiving area 126 may also include a latch release mechanism 130 for releasing the locking features 128 from their locking engagement. The latch release mechanism 130 generally includes an actuator for disengaging the locking features 128 and a biaser for providing a spring action that pushes the latch 122 away from the latch receiving area 124 when released. By way of example, the actuator may correspond to a knob, button, slider or switch that can be easily manipulated by a user, and the biaser may be a spring, flexure or deformable member In another embodiment, the latch 122 is configured to carry a data capture device 132 for capturing or collecting data. By integrating a data capture device into the latch, the space taken up by the laptop is preserved, i.e., adding a data capture device does not compromise the x, y and z dimensions of the laptop. The data capture device 132 may be configured to capture audio data, image data, and/or the like. In the case of audio data, the data capture device 132 may include a microphone and in the case of image data the data capture device 132 may include a camera. The camera may be configured to produce a single image, images at intervals or a live video stream. In some cases, the data capture device 132 combines a camera and one or more microphones into a single unit. In other cases, the data capture device 132 only includes one of these components. By way of example, the camera may include image sensors such as charge coupled device (CCD) or complimentary oxide semiconductor (CMOS) and optics such as lenses, splitters, filters and the like. In addition, the microphone may include diaphragms, amplifiers, digital signal processors (DSP), etc.

To elaborate, the data capture device 132 may be mounted to the surface of the latch 122 or it may be embedded or enclosed inside the latch 122. When embedded or enclosed, the latch 122 typically includes an opening so as not to impede the line of sight of the data capture device 132.

In order to make the data capture device 132 more user friendly, the latch 122 may be configured to move relative to the lid 104 rather than being fixed thereto. By way of example, the latch 122 may pivot, swivel and/or translate relative to the lid 104 so that the position of the data capture device 132 can be adjusted. The pivot action, (as shown by arrow 134), allows the latch 122 to rotate forwards and backwards, the swivel action (as shown by arrow 136) allows the latch 122 to rotate side to side, and the translating action (as shown by arrows 138 and 140) allows the latch 122 to slide up and down or side to side, respectively. These types of motions may be particularly useful when using a data capture device such as a camera during video conferencing. The motions can be formed from various mechanisms including but not limited to one or more pin joints, slider joints, ball and socket joints, flexure joints and the like. The motions can also be formed from a combination of joints as for example a pivot/translating joint, pivot/flexure joint, pivot/ball and socket joint, translating/flexure joint, and the like. The motions can also be formed from various memory materials that can be bent, twisted or otherwise deformed in order to place the latch 122 in the desired position.

As shown in FIG. 1C, the latch 122 may be detachable from the lid 104. This may allow a user to place the data capture device 132 in more advantageous position for capturing data. By way of example, this may allow a user to use a latch camera as a point and click camera or a latch microphone as a speaker's or singer's microphone. If detachable, the lid 104 may include a docking station or latch bay 142 for receiving the latch 122. The docking station 142 may be movable relative to the lid 104 or the removable latch 122 when attached may be movable relative to the docking station 142 in order to provide the pivot, swivel and/or translation. A locking mechanism 144 may be provided between the latch 122 and the docking station 142 in order to lock and release the latch 122 to and from the lid 104. When detached, the data capture device 132 contained within the latch 122 may be connected to the lid 104 through wires or cables 146 that provide an electrical connection to the internal components of the portable computer 100. Alternatively, the latch 122 may include a memory module, battery and associated electronics thereby making the latch a fully operable stand alone device as for example a point and click camera. The latch may additionally include a small LCD so that the user can view the images stored in the memory module. In cases such as these, the latch 122 may include a connector that operatively couples with a connector located in the docking station 142. In a similar vein, the latch 122 and docking station 142 may include wireless transceivers based on FM, RF, Bluetooth, 802.11, UWB (ultra wide band), IR, magnetic link (induction) and/or the like.

In another embodiment, the latch 122 is configured to carry one or more indicators 148 for alerting a user to a particular status or a change in status of the portable computer 100. By integrating an indicator into the latch, the other surfaces of the laptop can be preserved, i.e., adding an indicator does not compromise the surfaces of the base or lid. For example, latch 122 may include a power/sleep indicator that alerts a user as to when the computer 100 is on/off or in a sleep mode. Sleep indicators are typically illuminated when the computer is on, and not illuminated when the computer is off. Furthermore, sleep indicators may turn on and off or cycle with increasing or decreasing intensity (ebb) when in sleep mode. The indicators 148 can be placed at any location on the latch 122. Some positions may be more desirable than others. For example, the sleep indicator may be placed on the backside of the latch 122 as shown so that it can be seen when the lid 104 is closed and the latch 122 is engaged with the latch receiving area 124 of the base 102.

Although not shown, the indicators 148 generally include a light source such as an LED. The LED may be placed in an opening in the latch 122 or they may be hidden within the latch 122. If the later, the latch housing 123 may include a clear or translucent insert that is located in front of the LED. The LED is configured to illuminate the insert. The insert may include a light diffuser in order to hide the internal components of the latch while still allowing light to pass therethrough. Furthermore, the insert may be any shape. By way of example, the insert may be a logo such as a computer manufacturer logo, or some other character or shape. In cases where there is limited space, the indicator 148 may include light guiding or piping materials that allow the light source to be placed at various locations within the latch 122. In some cases, the insert may serve as both the indicator window and a light guiding medium. Alternatively, the latch housing 123 may be formed from a clear or translucent material thereby eliminating the insert. The illuminable area of the latch housing 123 may constitute a small portion of the latch housing 123 or the entire latch housing 123 may be illuminable. Furthermore, a mask may be used to produce shapes like the insert when utilizing a translucent latch housing.

It is contemplated that the portable computer 100 can be lap top computer such as an IBM compatible computer or an Apple compatible computer. By way of example, the Apple compatible computer may include different models such as the iBook, or Titanium models, which are manufactured by Apple Computer, Inc. of Cupertino, Calif.

FIGS. 2A-2D are diagrams of laptop computer 150, in accordance with one embodiment of the present invention. By way of example, the laptop computer 150 may generally correspond to the portable computer 100 shown and described in FIG. 1. FIG. 2A is a front elevation view of the laptop computer 150 in an open position. FIG. 2B is a side elevation view, in cross section (taken substantially along line A-A) of the laptop computer 150 in the open position. FIG. 2C is a front elevation view of the laptop computer 150 in a closed position. FIG. 2D is a side elevation view, in cross section (taken substantially along line B-B) of the laptop computer 150 in the closed position.

As shown, the laptop computer 150 includes a base 152 and a lid 154 that is pivotable relative to the base 152 via a hinge mechanism 156. The hinge mechanism 156 allows the lid 154 to pivot about axis 158 through various angles α relative to the base 152. For example, the lid 154 may be pivoted between the open position (as shown in FIGS. 2A and 2B) and the closed position (as shown in FIGS. 2C and 2D). Although not shown, the hinge mechanism 156 may include a braking feature that holds the lid 154 in its various positions between the open and closed position. The braking feature essentially allows a user to position the lid 154 at any angle during use. In most cases, there is a maximum angle, which corresponds to the fully open position. The maximum angle is typically somewhere between about 90 degrees to about 180 degrees. The minimum angle is typically set at 0 degrees, i.e., at the interface between the lid 154 and base 152 when the lid 154 is in the closed position.

The lid 154 generally includes an LCD panel 160 that is surrounded at its periphery by a bezel 162. The lid 154 also includes a latch 164 that is attached to the bezel 162. The latch 164 is configured to mate with a cut out 166 in the base 152 in order to secure the lid 154 to the base 152 and to produce an aesthetic looking enclosure when the lid 154 is placed in the closed position. The latch 164 is generally dimensioned for receipt within the cut out 166 so that it resides within the cut out 166 when the lid 154 is closed. In most cases, the back surface 168 of the latch 164 is made flush with the outer surface 170 of the base 152 in order to produce a substantially continuous outer surface when the latch 164 is positioned within the cut out 166.

In order to lock the latch 164 to the base 152 and thus the lid 154 to the base 152 when the lid 154 is in the closed position, the latch 164 includes a latch-side locking feature 172 that is configured to lockably engage a base-side locking feature 174. By way of example, the base-side locking feature 174 may be a plunger and the latch-side locking feature 172 may be a hook that is capable of capturing the plunger. The position of the locking features 172 and 174 may be widely varied, i.e., they may be positioned at any of the mating surfaces between the latch 164 and the cut out 166. In the illustrated embodiment, the latch side locking feature 172 is positioned on a front surface 176 of the latch 164, and the base side locking feature 174 is positioned on a front surface 178 of the base inside the cut out 166. In order to release the locking features 172 and 174 as for example the plunger from the hook, the latch 164 also includes a slider 180. The slider 180 is slidably coupled to the latch housing and is configured to disengage the locking features 172 and 174 when translated from a first position to a second position.

The latch 164 is configured to carry a camera 184. The camera 184 may for example correspond to a digital camera such as a point and click camera, camcorder, web cam, videoconferencing camera or the like. The camera is disposed inside a latch housing 186, and is configured to capture image data through an opening in the latch housing 186. By way of example, the camera 184 may include a CMOS image sensor chip and a lens assembly. The camera 184 may be attached to a portion of the latch housing 186 and/or a printed circuit board located within the latch housing 186. In fact, the PCB may be part of the camera 184. In most cases, the camera 184 is electrically coupled to control electronics in the base 152 through wires that extend from the PCB, through the bezel 162 of the lid 154, through the hinge mechanism 156 and into the base 152.

As shown, the latch 164 is pivotable relative to the bezel 162 via a second hinge mechanism 188. The second hinge mechanism 188 allows the latch 164 to pivot about axis 190 through various angles β relative to the lid 154. For example, the latch 164 may be pivoted between a first position (as shown in FIGS. 2A and 2B) and a second position (as shown in FIGS. 2C and 2D). By providing a pivoting action, the position of the latch 164 may be adjusted to place the latch 164 within the cut out 166 when the lid 154 is closed or being closed and to place the latch 166 in multiple camera viewing positions when the lid 154 is opened. For example, during a videoconference, the user can adjust the latch position to place the line of sight 192 of the camera 184 on the user.

In most cases, there is a maximum and minimum angle β. The maximum angle β is typically about 180 degrees so that the latch 164 lines up with the rest of the lid 154 when the lid is opened. The minimum angle β is typically set at 90 degrees so that the latch 164 can be positioned within the cut out 166 adjacent the outer surface of the base 178 and not closer than that to eliminate impinging the latch 164 when the lid 154 is closed. It should be noted, however, that these maximums and minimums are not a limitation. For example, the maximum β may be closer to 360 degree in order to allow the latch 164 to pivot around the top surface of the lid 154 so that the camera 184 can be used on the other side of the lid 154. In cases such as this, the control electronics may be configured to reverse the captured image(s) so that the image(s) is right side up when viewed as for example on the LCD 160.

Although not shown, the laptop computer 150 may include a positioning device for controlling the rotation of the latch 164 about the axis 190. The positioning device may be widely varied. For example, like the first hinge mechanism, the second hinge mechanism may include a braking feature that holds the latch 164 in its various positions between the first and second position. The braking feature essentially allows a user to position the lid at any angle during use. The user simply grasps and pivots the latch 164 to the desired position. Once positioned, the braking feature holds the latch 164 in the desired position. The braking feature may for example include friction washers, detents, gears and/or the like.

Alternatively, an electronic actuator for rotating the latch 164 about the axis 190 may be used. For example, the actuator may correspond to a motor such as a servo motor. The actuator may be housed in the latch housing 186, the hinge mechanism 188, the bezel 162, the hinge mechanism 156 and even within the base 152. The actuator may be directly coupled to the latch 164 or it may be indirectly coupled to the latch through various motion transformers such as gears, cables, belts and the like. Furthermore, the actuator may be controlled directly through an electronic switch or button dedicated to rotating the latch 164 or indirectly through software and the user interface of the laptop computer 150. For example, the user may press the arrow keys to move the latch 164 to the desired position.

In one embodiment, the latch 164 is automatically positioned in a home position when the lid 154 is opened. The home position may be some preset position set by the manufacturer or a position previously set by the user. The home position may place the latch 164 in a position that sets the appropriate camera viewing angle on the user or some other angle as for example an angle that places the latch 164 in line with the lid 154. By way of example, the home position may be between about 0 and 360 degrees, more particularly between about 90 and 270 degrees, and even more particularly about 180 degrees. Even though a home position may be provided, it should be noted that in most cases the latch may be moved from the home position to other positions once the lid is opened. This gives the user the ability to fine tune the position of the latch 164 and thus the camera during use.

In addition, the latch 164 may also be automatically positioned in a lock position when the lid 154 is closed. The lock position is typically the position that places the latch 164 within the cut out 166 adjacent the outer surface 178 of the base 152 so that the locking features 172 and 174 can engage with one another. That is, the lock position places the front side of the latch 164 next to the front surface 178 within the cut out 166. In some cases, the timing may set up so that as the lid 154 finally closes, the latch 164 finally rotates into the cut out 166. That is, as the lid 154 is finally closing the latch 164 assumes the locked position.

In most cases, the positioning of the latch is configured to adjust or change in accordance with the positioning of the lid.

For example, as the angle α increases in order to open the lid 154, the angle β increases in order to place the latch 164 in the home position and as the angle α decreases in order to close the lid 154, the angle decreases β in order to place the latch 164 in the locked position. In one implementation of this embodiment, the positioning device includes a latch tilting mechanism. The latch tilting mechanism is configured to convert the rotation of the lid 154 about the axis 158 to rotation of the latch 164 about the axis 190. That is, when the lid 154 is opened or closed, the latch tilting mechanism causes the latch 164 to pivot to the home or locked positions. The latch tilting mechanism may include a belt that rotatably couples an axle of the first hinge mechanism 156 to an axle of the second hinge mechanism 188. In most cases, the belt travels through the bezel 162 from the axle of the first hinge mechanism 156 to an axle of the second hinge mechanism 188. When the lid 154 is opened thus increasing α, the rotation of the axle causes the belt to move in the clockwise direction. The clockwise motion of the belt in turn causes the axle of the second hinge mechanism 188 to move in the clockwise direction. Because the axle is mounted to the latch 164, the clockwise motion of the axle causes the latch 164 to rotate about its axis in a clockwise manner thus increasing β. This clockwise motion cause the latch 164 to pivot from the locked to home position. When the lid 154 is closed, the reverse is true, i.e., everything moves in a counterclockwise motion. Although a belt is described in should be noted that this is not a limitation and that the latch tilting mechanism may include gears, cams, and the like.

The latch 164 is also configured to carry a symbol illumination system. The symbol illumination system operates to illuminate a symbol 196 on an illuminable portion of the latch housing 186 using light provided by a light source. The symbol 196 may be widely varied. For example, the symbol 196 may be one or more characters, letters or numbers; a simple shape such a circle, rectangle, square, triangle, etc., or it may be a more complex shape such as, icon, logo, etc. In one configuration, the symbol 196 is an Apple corresponding to the Apple logo used by Apple Computer of Cupertino, Calif. The location of the symbol 196 can also be widely varied. For example, it can be positioned on any surface of the latch 164. In the illustrated embodiment, the symbol 196 is placed on the backside 168 of the latch 164 so that it can be seen by the user when the latch 164 is positioned within the cut out 166.

The symbol illumination system may be widely varied. By way of example, the light source may be one or more light emitting diodes (LED), LCD panels, light emitting semiconductor dies, lasers, incandescent light bulbs, fluorescent light bulbs, neon tubes, and the like that produce white or colored light. The light source may even correspond to the LCD 160 contained within the lid 154. For example, the backlighting from the LCD panel may be used to illuminate the illuminable portion. Furthermore, the illuminable portion may be a clear or translucent portion of the latch housing 186 or it may be provided by a separate piece of clear or translucent material that is inserted and affixed within an opening in the (translucent or non-translucent) housing. By way of example, the illuminable portion may be formed from glass or plastic materials such as polycarbonate, acrylic and the like. The illuminable portion may include a light diffusing means or color filtering means located either internal or external to the illuminable portion. As should be appreciated, the light diffusing means scatters the transmitted light to produce a characteristic glow that emanates from the outer surface of the illuminable portion, and the color filtering means allows certain colors to pass through thereby causing the illumination portion to exude a certain color.

The light source is typically placed inside the latch housing 186 behind the illuminable portion so that the illuminable portion can be illuminated thereby creating the symbol (e.g., lit up). Generally speaking, a symbol image is formed at the outer surface of the illuminable portion, and may even glow, when light is made incident on the inner surface of illuminable portion via the light source. In cases where the light source cannot be placed behind the illuminable portion, a light directing element such as a light pipe or light guide can be used to direct the light from the light source to the illuminable portion. The light directing element may be a separate component or it may be integral with the illuminable portion. The symbol illumination system may additionally include a masking element for helping produce the desired symbol shape. The masking element generally includes an opening corresponding to the symbol image to be illuminated.

The light source of the symbol illumination system is typically controlled by the control electronics stored in the base of the laptop 150 so as to produce a symbol light effect having specific characteristics or attributes. For example, the light may be used to exhibit a behavior that reflects the desires or moods of the user, that reflects inputs or outputs for the laptop computer 150, or that reacts to tasks or events associated with operation of the laptop computer 150. In most cases, illumination processing includes monitoring events associated with the laptop computer 150 (e.g., software or hardware) and controlling the light source based on the monitored events so as to indicate a status corresponding to the monitored event. The events being monitored are generally identified by an operating system or a microprocessor utilized within the laptop computer 150. The events can take many forms such as operating system events or microprocessor events. By way of example, the events may relate to signals, conditions or status of the laptop computer 150 and/or to any devices or systems attached thereto (e.g., i/o devices, internet, etc.). The light source may be controlled in a manner that produces different symbol light effects for different events. For example, the light source may be configured to blink, ebb or produce different colors depending on the events that occurred. The light source may produce a red blinking light when a first event has been implemented, and solid blue light when a second event has been implemented.

The illumination characteristics and their associated with specific events may be stored in a database. Illumination characteristics generally refer to how a light source is illuminated to produce a visual effect (e.g., which lights are operated, how long the light sources are operated, what color the light source output, etc.). The illumination characteristics stored in the database may be accessed by a user through a light control menu, which may be viewed on the LCD as part of a GUI interface. The light control menu may serve as a control panel for reviewing and/or customizing the illumination characteristics, i.e., the user may quickly and conveniently review the illumination characteristics and make changes thereto. Once the user saves the changes, the modified illumination characteristics will be employed to handle future illumination processing.

Referring to FIGS. 3-7 a latch assembly 200 will be described in accordance with one embodiment of the present invention. The latch assembly 200 includes a latch 202 that is pivotally coupled to a bezel 204. As shown, the latch 202 includes a latch housing 206 that is positioned within a recess 208 in the bezel 204. The recess 208 and latch housing 206 are dimension to allow the latch 206 to pivot within the recess 208. The latch housing 206 includes an axle 210 fixed thereto. The axle 210 may be a separate component or it may be integral with the latch housing 206. When a separate piece, the axle 210 may be attached using any suitable attachment means, including press fitting, screws, bolts, adhesives, etc. In one example, the axle 210 is press fit into a through hole in the latch housing 206.

As shown in FIG. 3, the axle 210 is received by a pair of bushings 212 located on opposing sides of the latch housing 206. The opposing ends of the axle 210 extend through through-holes in the bezel 204 and are supported by bushings 212 contained within the space provided between a display 214 and the bezel 204. The bushings 212 typically include through holes 216 for rotatably receiving the ends of the axle 210. The bushings 212 may be separate components or they may be integrally formed with the bezel 204. If separate, they may be attached using any suitable attachment means, including press fitting, snaps, screws, bolts, adhesives, etc. Because of this configuration, the latch 202 is configured to pivot relative to the bezel 204.

Figure 7A:
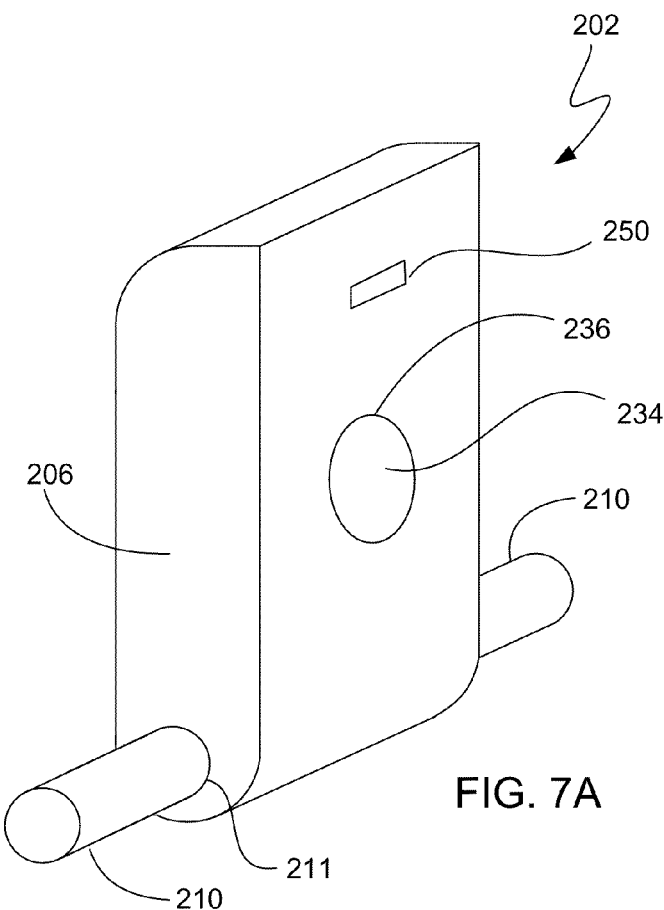
FIG. 7A is a front perspective view of a latch, in accordance with one embodiment of the present invention.
Figure 7B:
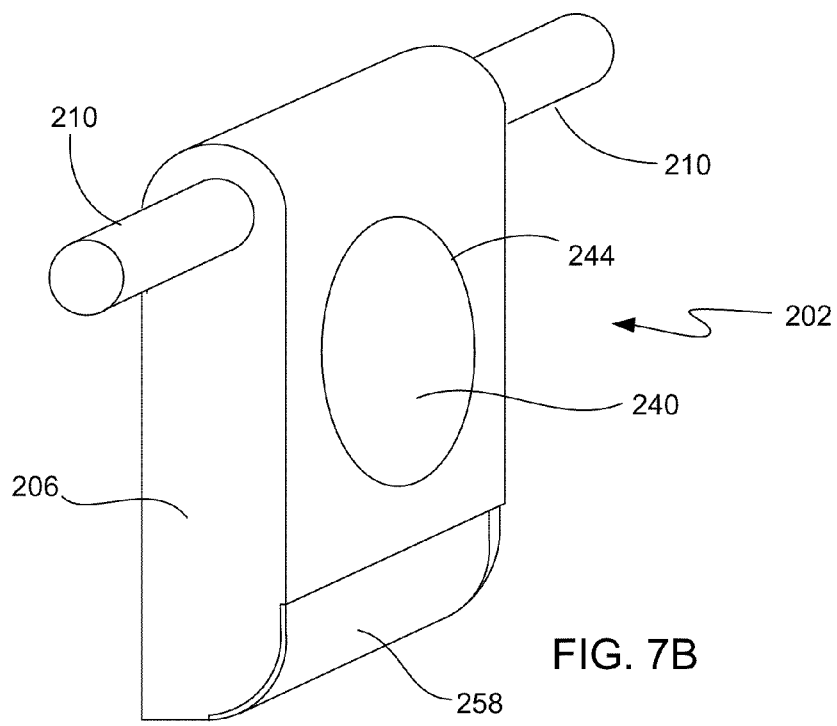
FIG. 7B is a rear perspective view of a latch, in accordance with one embodiment of the present invention.

As shown in FIGS. 3, 4 and 7, the latch housing 206 is configured to contain several components including a camera module 220, a locking mechanism 222, and a symbol illumination system 224. The camera module 220 includes at least a CMOS image sensor chip 226, a lens assembly 228 and a printed circuit board 230. The CMOS image sensor chip 226 and lens assembly 228 are both mechanically and electrically coupled to the PCB 230. The PCB 230 is structurally attached to an interior portion of the latch housing 206 as for example using screws. The printed circuit board 230 is electrically coupled to control electronics through flex wires 232 that extend from the PCB 230, through an opening in the latch axle 210, through the bezel 204. In laptop computers, the flex wires may additionally travel though a hinge mechanism and into the base. The position of the lens assembly 228 inside the latch housing preferable places the outer lens 234 of the lens assembly 228 adjacent an opening 236 in the latch housing 206. The outer lens 234 may be recessed behind, flush with, or extend outside the latch housing 206 via the opening 236. In the illustrated embodiment, the outer lens 234 is substantially flush with the outer surface of the latch housing 206 so that it sits within the opening, but not past it. This is generally done to both protect the outer lens and other components that it may interfere with it if it extended out of the latch housing 206.

The symbol illumination system 224 includes an insert 240 and one or more LEDs 242. The one or more LEDs 242 are both mechanically and electrically coupled to the printed circuit board 232 of the camera module 220. The insert 240 is positioned within an opening 244 in the latch housing 206. By way of example, the insert 240 may be press fit into the opening 244. The insert 240 is formed from a translucent material. The translucency of the insert 240 is configured to allow the passage of light therethrough while preventing the user from clearly seeing or distinguishing objects through it as for example the LEDs 242 or the printed circuit board 232. That is, the insert 240 transmits light while causing sufficient diffusion to prevent perception of distinct objects located behind it. The insert 240 may, for example, include a light diffusing means located either internal or external to the insert 240. In this embodiment, the LED(s) 242 are side firing LEDs, i.e., the light produced therefrom is made incident on the side surface of the insert 240. Any number of side-firing LEDs 242 may be placed around the perimeter of the insert 240. The number of LEDs chosen preferably produces enough illumination to emit a characteristic glow that emanates equally from the outer surface of the insert 240. In one configuration, the symbol illumination system 224 includes red, blue, green and white LEDs that work together to produce the different colors of the color spectrum (e.g., mixing). This particular arrangement allows a laptop to change the color of the insert 240 according to specific tasks being performed in the laptop computer.

The locking mechanism 222 is not shown in great detail in FIGS. 3-7. These figures, however, do show a slit 250 in the latch housing 206. The slit 250 is configured to receive a plunger 252 located on the base 254 when the latch 202 is placed in the closed or locked position as shown in the previous figures. That is, when the lid is closed and the latch 202 is positioned within a cut out 256 in the base 254, the plunger 252 may be inserted into the slit 250 so that it can interact with a locking feature contained in the latch housing 206. These figures also show a slide switch 258 that is used by the locking mechanism 222 to disengage the plunger 252 from the locking feature located behind the slit 250. The slide switch 258 is slidably coupled to the latch housing 206. For example, the slide switch 258 may include a rail that is retained within a channel in the latch housing 206. In most cases, the slider switch is flush with the outer surface of latch housing in order to preserve a continuous look on the latch. Furthermore, the slider switch may include tactile bumps or knurls to help a user manipulate it.

Referring to FIGS. 8A-8D, the locking mechanism 222 will be described in accordance with one embodiment of the present invention. As described above, the latch mechanism includes a slit 250 disposed in the latch housing 206, and a slider switch 258 slidably coupled to the latch housing 206. The slit 250 is cooperatively positioned with the plunger 252 and is dimensioned to receive the plunger 252 therethrough when the latch 202 is placed within the cutout 256 of the base 254. The plunger 252 generally has a length that allows it to extend through the slit 250 to engage a spring element 260 and hook 262 located within the latch housing 206.

The spring element 260 is cooperatively positioned with the plunger 252, i.e., the central axis of the plunger 252 is substantially aligned with the central axis of the spring element 260. The spring element 260 is configured to provide a spring resistance to the plunger 252 when the plunger 252 is inserted into the slit 250. That is, when the latch 202 is pushed towards the base 254 using force F, the plunger 252 engages the spring element 260 and the force F works against the spring force of the spring element 260 until the latch 202 is placed in its desired position relative to the base 254. The spring element 260 can be widely varied. For example, it may correspond to a flexure, a cushion or deformable member, a spring, and the like. In the illustrated embodiment, the spring element 260 is a tension spring that is retained on a post 264 that protrudes out of the interior surface of the latch housing 206. When the latch 202 is closed, the spring element 260 in the form of a tension spring is compressed between the plunger 252 and the latch housing 206.

The hook 262 is positioned in the same plane as the plunger 252 and is arranged for lockably receiving the plunger 252 when the plunger 252 is inserted into the slit 250. The hook 262 is configured to rotate between a plunger receiving position for capturing the plunger 252 (as shown in FIG. 8A), and a plunger releasing position for releasing the plunger 252 (as shown in FIG. 8D). This is generally accomplished via a pivot pin that passes through the hook 262 and which is seated in the latch housing 206. As should be appreciated, when the hook 262 is placed in the latch receiving position, the hook 262 captures the plunger 252 thereby securing the latch 202 to the base 254. Conversely, when the hook 262 is placed in the latch releasing position, the plunger 252 is released from the hook 262, and the latch 202 is left unsecured relative to the base 254. Once unsecured, the both the lid and latch can be tilted as described above. Although not a requirement, the entire hook 262 is located inside the latch housing 206 at all times (e.g. both positions) to eliminate unsightly and harmful protrusions emanating from the latch 202.

A spring element 268 is used to continuously exert a biasing force on the hook 262 so as to place the hook 262 in the plunger receiving position. The spring element 268 causes the hook 262 to rotate about the pivot axis until it reaches a stop surface 270 that determines the latch receiving position. The stop surface may be widely varied. For example, it may be a portion of the latch housing 206 or the slider switch 258. In the illustrated embodiment, the stop surface 270 is formed by a flange 272 of the slider switch 258. In this manner, the spring element 268 also exerts a biasing force on the slider switch 258 thereby placing the slider switch 258 in its first position against an abutment stop located on the latch housing 206.

Because of space limitations, the spring element 268 generally corresponds to a torsion spring. The torsion spring has one end connected to the latch housing 206 and another end connected to the hook 262. As such, the torsion spring exerts a force on the hook 262 relative to the latch housing 206. It should be noted that the spring element 268 is not limited to torsion springs that other types of spring elements may be used. By way of example, compression and tension type springs may be used. Furthermore, deformable members or flexures may also be used. In fact, in some cases, the hook may be a flexure.

The slider switch 258 is configured to free the hook 262 from the plunger 252. The slider switch 258 allows a user to move the hook 262 from the plunger receiving position to the plunger releasing position using a simple translating motion. This is generally accomplished with the flange 272 that extends out of the slider switch 258 and that engages one end of the hook 262 thereby causing the hook 262 to rotate about its axis when the slider switch 258 translates from a first position to a second position. The slider switch 258 is generally biased in the first position via a spring force. The spring force may be provided by a third spring element or the second spring element 268 associated with the hook 262.

The operation of the locking mechanism 222 will now be described. In order to lock the latch 202 to the base 254, the latch 202 is pushed against the base 254 by a force F provided by a users hand or finger. As the latch 202 nears the base 254, the plunger 252 travels through the slit 250 and engages the spring element 260 contained within the latch housing 206. Because the spring element 260 is a tension spring, the tapered tip 274 of the plunger 252 nestles into the opening in the tension spring upon engagement. Once engaged, the force F works against the spring force in order to further advance the plunger 252. When the plunger 252 reaches the hook 262, the tapered tip 274 of the plunger 252 pushes against the tapered surface 276 of the hook 262 (cam action) thereby causing the hook 262 to rotate about its axis against the spring force provided by the second spring element 268. When the tapered tip 274 of the plunger 252 passes the tapered surface 276 of the hook 262, the hook 262 collapses back towards the plunger 252 via the spring force provided by the second spring element 268 thereby capturing the tip 274 of the plunger 252 within the catch of the hook 276. At this point the latch 202 is locked to the base 254.

In order to unlock the latch 202 from the base 254, the slider switch 258 is translated relative to the latch housing 206 by a force $F_2$ provided by a users finger or hand. As the slider switch 258 translates from the first position to the second position, the flange 272 of the slider switch 258 pushes against the hook 262 thereby causing the hook 262 to rotate about its axis against the spring force provided by the second spring element 268. When the hook 262 reaches the plunger releasing position, the plunger 252 is no longer captured by the hook 262 and the first spring element 260 provides a spring force against the plunger 251 that pushes the latch 202 away from the base 254. As the latch 202 moves away form the base 254, the plunger 252 exits the slit 250 thereby releasing the latch 202 from the base 254.

Figure 9A:
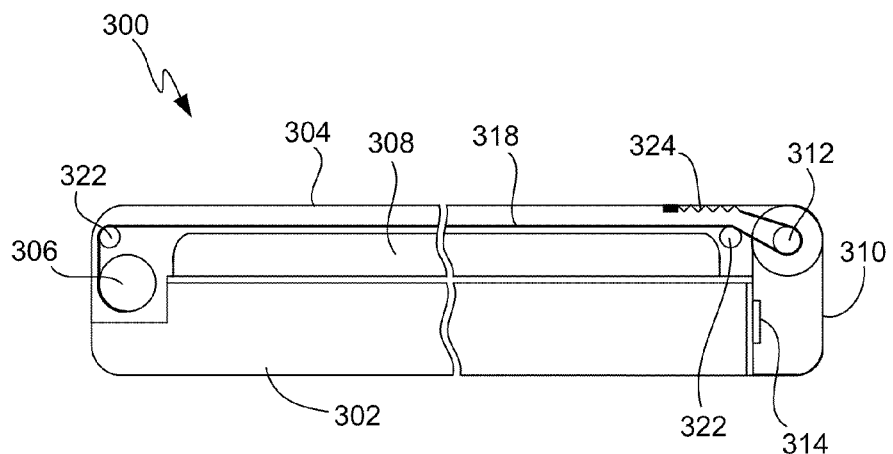
FIG. 9A is a side view of a laptop computer in a closed position, in accordance with one embodiment of the present invention.
Figure 9B:
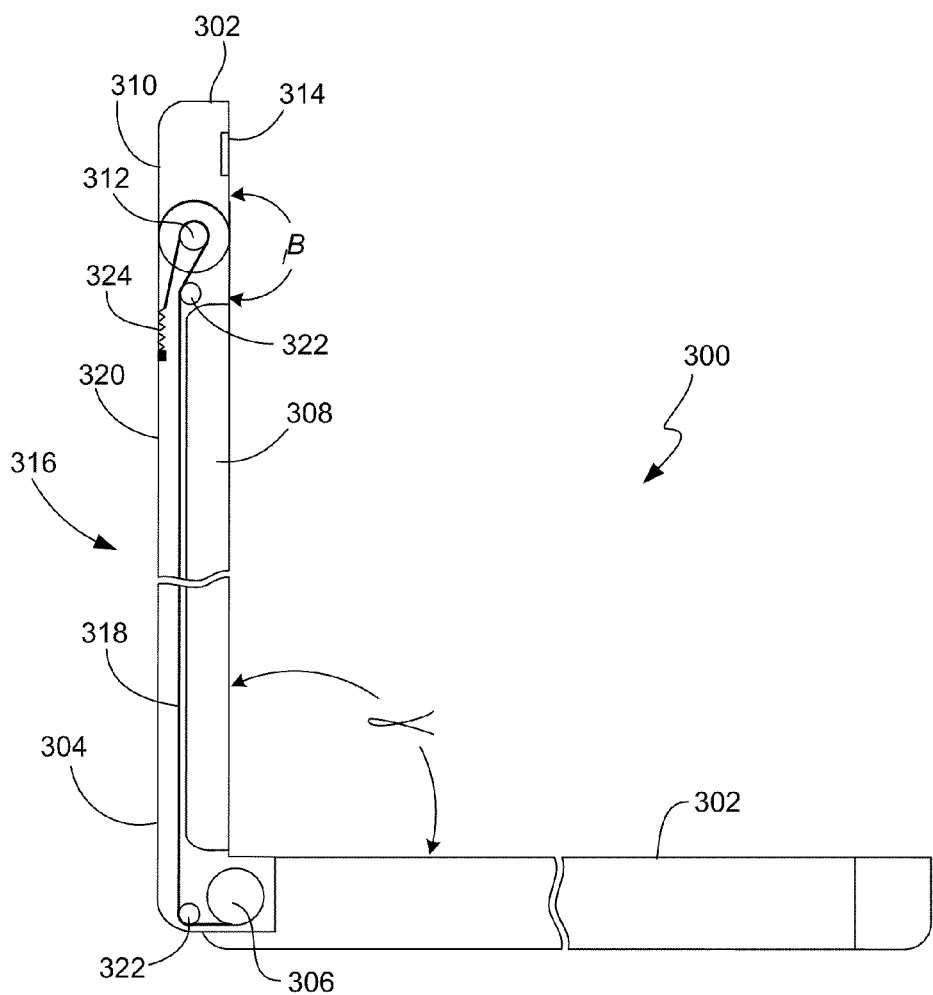
FIG. 9B is a side view of a laptop computer in an open position, in accordance with one embodiment of the present invention.

FIGS. 9A and 9B are simplified side views of a laptop computer 300, in accordance with one embodiment of the present invention. The laptop computer 300 includes a base 302 and a lid 304 that is pivotable coupled to the base 302 via a lid axle 306. The lid axle 306, which is attached to the lid 304 may for example be supported by bushings that are attached to the base 302. The lid 304 is positionable between an open position (as shown in FIG. 9B) and closed position (as shown in FIG. 9A). The closed position is generally set by the interface between the base 302 and the lid 304, i.e., the position that places the lid 304 adjacent the base 302 as shown in FIG. 9A. The open position is generally some angle α that allows a user to view a LCD panel 308 disposed inside the lid 304. The angle α may be widely varied. In the illustrated embodiment, the closed position corresponds to a position that places the lid 304 substantially 0 degrees relative to the base 302 as shown in FIG. 9A, and the open position corresponds to a position that places the lid 304 substantially 90 degrees relative to the base 302 as shown in FIG. 9B. Although there is a designated open position, it should be noted that the open position may be adjusted to other positions during use. For example, some users may prefer to place the lid 304 at an angle greater than 90 degrees for better viewing, especially when the laptop computer 300 sits low compared to the user.

The lid 304 includes a camera latch 310 that is pivotally coupled to the lid 304 via latch axle 312. The latch axle 312, which is attached to the latch 310 may for example be supported by bushings that are attached to the lid 304. The latch 310 is positionable between a home position (as shown in FIG. 9B) and locked position (as shown in FIG. 9A). The locked position is generally set by the interface between the camera latch 310 and the base 302, i.e., the position that places the camera latch 310 adjacent the base 302 as shown in FIG. 9A. The home position is generally some angle β that places the line of sight of a camera 314 of the camera latch 310 on the user. The angle β may be widely varied. In the illustrated embodiment, the locked position corresponds to a position that places the camera latch 310 substantially 90 degrees relative to the lid 304 as shown in FIG. 9A, and the home position corresponds to a position that places the camera latch 310 substantially 180 degrees relative to the lid 304 as shown in FIG. 9B. Although there is a designated home position, it should be noted that the position of the camera latch 310 may be adjusted from the home position to other positions during use. For example, tall users may prefer to place the camera latch 310 at an angle greater than 180 degrees while short users may prefer to place the camera latch 310 at an angle less than 180 degrees.

The laptop computer 300 also includes a latch tilting mechanism 316. The latch tilting mechanism 316 is configured to automatically place the camera latch 310 in the locked position when the lid 304 is placed in the closed position, and to automatically place the camera latch 310 in the home position when the lid 304 is placed in the open position. The latch tilting mechanism 316 includes a latch belt 318. The latch belt 318 is operatively coupled to the both the lid axle 306 and the latch axle 312. The latch belt 318 extends through the lid 304 between the lid housing 320 and the flat panel 308 contained therein. Rollers 322 may be provided to maintain the belt position between the lid housing 320 and the flat panel display 308. Alternatively, the belt 318 may rub against the surface of the flat panel 308 instead of using rollers 322.

As shown, the belt 318 is draped around the latch axle 312 and one end of the belt 318 is attached to the lid axle 306 and the other end of the belt 318 is attached to a tension spring 324 that is fixed to the lid housing 320. The tension spring 324 keeps the belt 318 under constant tension. The tension spring picks up any slack in the belt 318 thereby ensuring contact between the belt 318 and the latch axle 312. Alternatively, the tension spring may be replaced by a belt capable of stretching, i.e., the tension force is provided by the flexing of the belt. When the lid axle 306 is rotated from the closed to open position, the belt 318 is unrolled from the lid axle 306 and when the lid axle 306 is rotated from the open to closed position, the belt 318 is rolled up onto the lid axle 306. During both unrolling and rolling, the belt 318 moves over the latch axle 312 thereby causing the latch axle 312 to rotate about its axis. During unrolling, the latch axle 312 rotates in a first direction thereby causing the camera latch 310 to tilt to the home position. During rolling, the latch axle 312 rotates in a second direction thereby causing the camera latch 310 to tilt to the locked position.

The diameters of the axles 306 and 312 may be adjusted to effect the rotation of the latch 310 relative to the rotation of the lid 304. If the latch axle 312 and the lid axle 306 have the same diameter, the latch axle 312 will have the same amount of rotation as the lid axle 306. By way of example, if the lid 304 is rotated 90 degrees relative to the base 302 then the latch 310 will be rotated 90 degrees relative to the lid 304. Alternatively, if the latch axle 312 has a greater diameter than the lid axle 306, the latch axle 312 will have less rotation as the lid axle 306. By way of example, if the lid 304 is rotated 90 degrees relative to the base 302 then the latch 310 will be rotated less than 90 degrees relative to the lid 304. In addition, if the latch axle 312 has a smaller diameter than the lid axle 306, then latch axle 312 will have more rotation than the lid axle. By way of example, if the lid 304 is rotated 90 degrees relative to the base 302 then the latch 310 will be rotated more than 90 degrees relative to the lid 302.

Figure 10A:
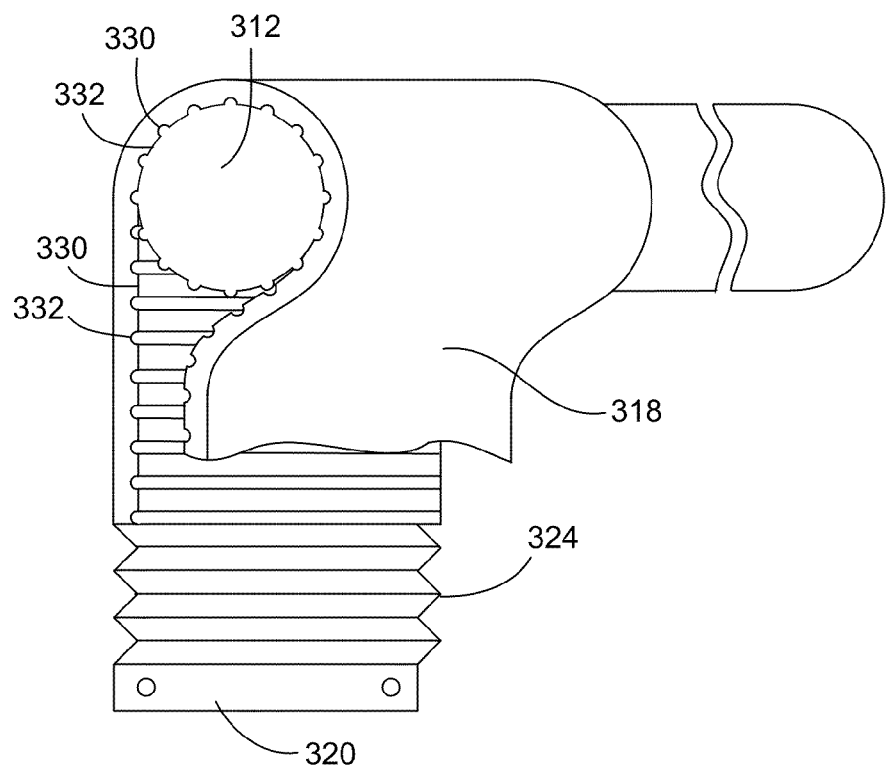
FIG. 10A is a perspective view of the camera latch portion of the camera tilt mechanism, in accordance with one embodiment of the present invention.
Figure 10B:
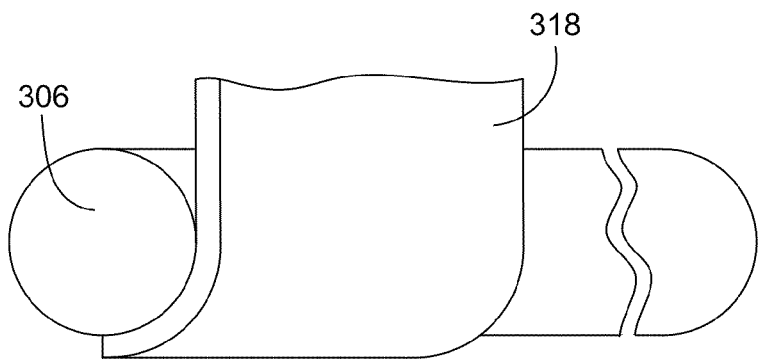
FIG. 10B is a perspective view of the lid portion of the camera tilt mechanism, in accordance with one embodiment of the present invention.

Referring to FIGS. 10A and 10B, the latch tilting mechanism 316 will be described in greater detail. FIG. 10A is a diagram of the camera latch portion of the camera tilt mechanism 316. FIG. 10B is a diagram of the lid portion of the camera tilt mechanism 316. As shown, a first end of the belt 318 is attached to the flat tension spring 324 that in turn is attached to the back of the lid housing 320, and a second end of the belt 318 is attached to the lid axle 306. Furthermore, both the latch axle 312 and the belt 318 (in the region of the latch axle 312) have teeth 330 separated by notches 332. The teeth 330 are configured to engage one another thereby causing the latch axle 312 to rotate about its axis when the belt 318 is rolled or unrolled relative to the lid axle 306. In essence, the teeth 330 of the belt 318 mate with the teeth 330 on the latch axle 312 in order to drive the positioning of the latch axle 312. When the lid axle rotates, the teeth located on the belt engage the corresponding teeth located on the latch axle. As the lid axle further rotates, each tooth engages another tooth thereby causing the latch axle and thus the latch to rotate about its axis.

Because of the tension spring 324, the camera latch 310 can be tilted away from the home position set by the mated teeth by asserting enough force to advance the latch axle 312 to the next notch position. This is accomplished without causing any rolling or unrolling of the belt 318, i.e., the position of the belt 318 stays stationary. The user simply pushes or pulls on the latch 310. When the pulling or pushing force is great enough, the latch axle 312 is caused it to slip relative to the belt 318 thereby causing the next tooth on the latch axle 312 to engage the next notch on the belt 318, i.e., the pulling or pushing force overcomes the tension force and any forces found between the mated teeth. In most cases, the slipping teeth create a click that gives the user the ability to feel when the camera latch 310 has moved to the next position. That is, the teeth serve as detents that provide a tactile way for the user to know when the latch camera 310 has reached a certain position. The number of latch positions generally corresponds to the number and dimensions of the teeth and notches. It is generally believed that more closely packed teeth/notches produces greater resolution. That is, the more closely packed teeth/notches, the smaller the incremental changes in distance moved by the latch axle and thus the camera latch. As should be appreciated, if there are N equidistance teeth/notch positions, discrete tilt angles of 360/N are possible.

Figure 11:
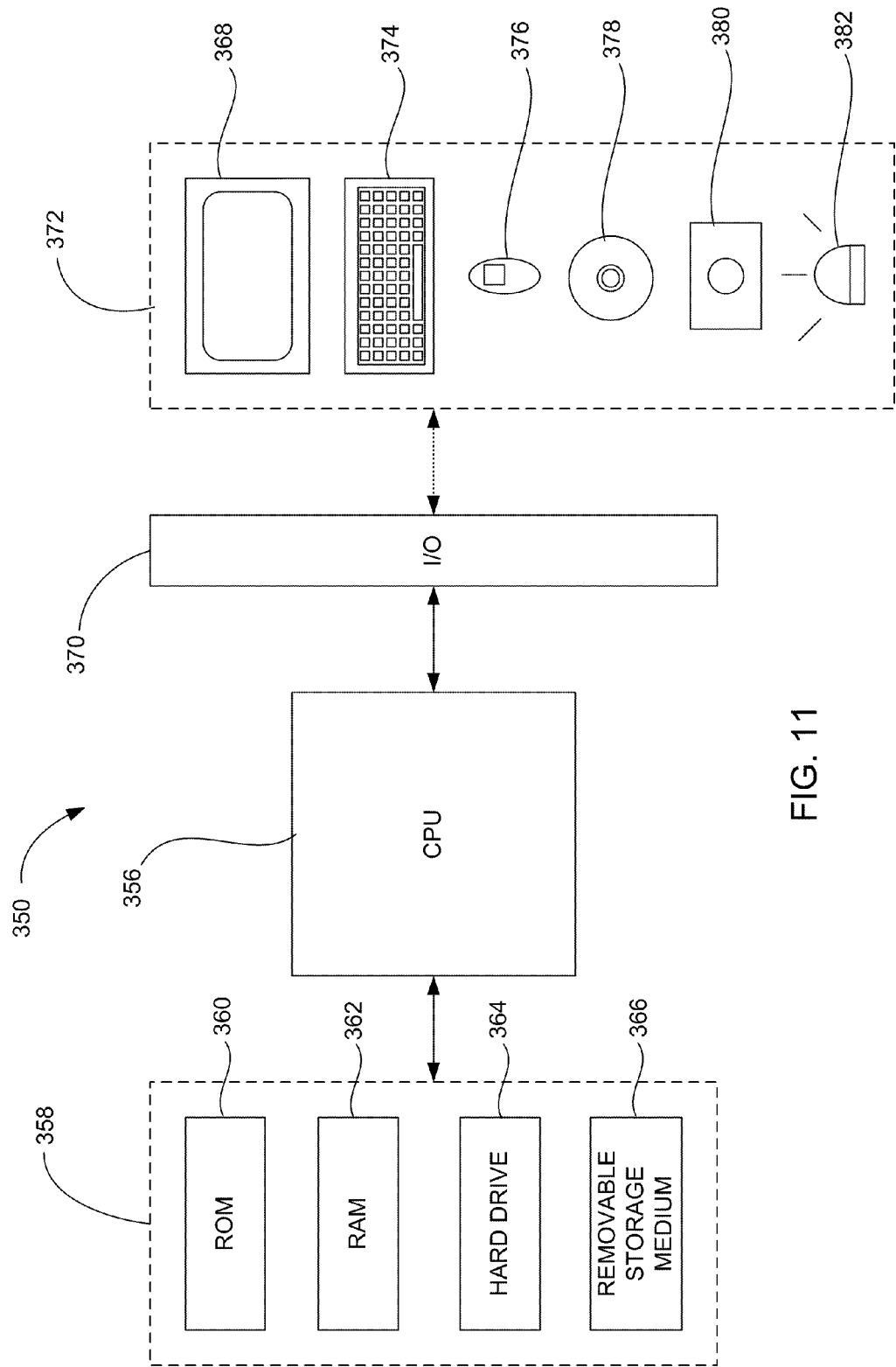
FIG. 11 is a block diagram of a computer system, in accordance with one embodiment of the present invention.

FIG. 11 is a block diagram of a computer system 350, in accordance with one embodiment of the present invention. The computer system 350 may for example correspond to a laptop computer such as any of those previously described. As shown, the computer system 350 includes a processor 356 configured to execute instructions and to carry out operations associated with the computer system 350. For example, using instructions retrieved for example from memory, the processor 356 may control the reception and manipulation of input and output data between components of the computing system 350. The processor 356 can be a single-chip processor or can be implemented with multiple components.

In most cases, the processor 356 together with an operating system operates to execute computer code and produce and use data. The computer code and data may reside within a program storage block 358 that is operatively coupled to the processor 356. Program storage block 358 generally provides a place to hold data that is being used by the computer system 350. By way of example, the program storage block may include Read-Only Memory (ROM) 360, Random-Access Memory (RAM) 362, hard disk drive 364 and/or the like. The computer code and data could also reside on a removable storage medium 366 and loaded or installed onto the computer system 350 when needed. Removable storage mediums include, for example, CD-ROM, DVD, PC-CARD, floppy disk, magnetic tape, and a network component.

The computer system 350 also includes a display device 368 that is operatively coupled to the processor 356. The display device 368 is configured to display a graphical user interface (GUI) including perhaps a pointer or cursor as well as other information to the user. By way of example, the display device 368 may be a monochrome display, color graphics adapter (CGA) display, enhanced graphics adapter (EGA) display, variable-graphics-array (VGA) display, super VGA display, liquid crystal display (e.g., active matrix, passive matrix and the like), cathode ray tube (CRT), plasma displays and the like.

The computer system 350 also includes input/output (I/O) circuitry 370 that is operatively coupled to the processor 356. The I/O circuitry 370 includes one or more controllers that may be integrated with the processor 356 or that may be separate components. The I/O circuitry 370 is generally configured to control interactions with one or more I/O devices 372 that can be coupled to the computer system 350. By way of example, the I/O devices 372 may be internal or peripheral devices such as memory, disk drives, keyboards, mice, track pads, printers, scanners, speakers, video cameras, music players and the like. The I/O devices 372 may also be network-related devices such as network cards or modems. As should be appreciated, each of these devices may include a separate microcontroller for processing data at the device.

The I/O circuitry 370 generally operates by exchanging data between the computer system 350 and the I/O devices 372 that desire to communicate with the computer system 350. In some cases, the I/O devices 372 may be connected to the I/O circuitry 370 through wired connections. When the I/O devices 372 are integrated into a single unit as for example a base of a laptop computer, the devices 372 are typically hard wired (unless they can be removably detached). When the I/O devices 372 are stand alone devices, the I/O devices 372 are typically connected through cables and connectors such as USB or Firewire. The I/O circuitry 370 may additionally include one or more media bays (expansion bays) capable of receiving media bay devices (expansion bay devices) to provide greater resources to the computer system. The media bays are accessible from external to the computer system so that media bay devices can be easily be inserted into the media bays or removed from the media bays. The removability of the media bay devices allows a few media bays to support a variety of different types of devices in a flexible manner. Alternatively, the I/O devices may be connected to the I/O circuitry 370 through wireless connections. By way of example, the data link may correspond to PS/2, USB, IR, RF, Bluetooth or the like.

In the illustrated embodiment, the I/O devices 372 include at least a keyboard 374, a tracking device 376, a disk drive 378, a camera module 380 and a symbol illuminator 382. The keyboard 374 is configured to deliver input commands and other instructions to the computer system 350. The tracking device 376 is configured to deliver movement commands, i.e., the tracking device may be used to move a cursor or pointer or to implement a scrolling function on the display screen. The tracking device 376 may take the form of a mouse, a track ball, a touch pad, a stylus, a tablet and the like. The disk drive 378, which facilitates transporting such data to other computer systems, is configured to store various types of data. The camera module 380 is configured to record and store images in digital form, and to feed these images to the processor 356. Furthermore, the symbol illuminator 382 is configured to produce light in a controlled manner via one or more light sources. The light sources may for example be operatively coupled to the processor 356. The light may be used to indicate a status of the computer system 350.

While this invention has been described in terms of several preferred embodiments, there are alterations, permutations, and equivalents, which fall within the scope of this invention. For example, although the invention is primarily directed at a camera latch for a laptop computer, it should be noted that concepts disclosed herein may also be applied to other electronic devices, including but not limited to PDAs, music players, mobile phones and the like or I/O devices such as monitors, televisions and the like. It should also be noted that there are many alternative ways of implementing the methods and apparatuses of the present invention. For example, although the locking mechanism was described as including both a hidden locking feature (hook) and an exposed locking feature (plunger), it should be noted that in some cases the plunger may be hidden. As should be appreciated, plungers may be unsightly and potentially dangerous. A protruding plunger may result in the plunger being accidentally sheared off when it comes into contact with some other object. Also, if the plunger is accidentally slammed on a finger, or if the plunger hooks on clothing, it can cause injury or damage, leaving a negative impression on the user. By way of example, the hidden plunger may be extracted from the base using magnetic locking system as described in U.S. Pat. No. 6,659, 516. Furthermore, in some cases, it may be desirable to reverse the automatic positioning of the latch relative to the base once the latch is placed in the home position and the lid is opened in order to ensure that the line of sight of the camera is directed at the user. For example, as the angle α increases, the angle β decreases and as the angle α decreases, the angle increases β increases in order to keep the line of sight directed at the user. It is therefore intended that the following appended claims be interpreted as including all such alterations and permutations.

What is claimed is:

1. A method of producing a symbol light effect on an illuminable portion of a latch coupled to a lid of a portable computer, comprising:
   monitoring an event associated with the computer, wherein monitoring is performed by a processor of the computer; and
   associating the monitored event with an illumination characteristic;
   controlling a light source based on the monitored event and illumination characteristic to indicate a status of the monitored event, the light source being positioned inside a housing of the latch, wherein the light source is a side firing LED.

2. The method of claim 1, wherein the monitored event and illumination characteristic are stored in a database of the computer.

3. The method of claim 2, wherein the illumination characteristic may be customized by a user.

4. The method of claim 1, wherein the monitored event is related to the portable computer or a device attached to the portable computer.

5. The method of claim 1, further comprising controlling the light source to produce different symbol light effects for different events.

6. A method of illuminating a symbol on an illuminable portion of a latch coupled to a lid of a portable computer, comprising:
   monitoring an event associated with the computer; and
   controlling a light source to illuminate the symbol, the light source being a side firing LED positioned inside a housing of the latch, wherein the symbol has a characteristic associated with the event, wherein monitoring and controlling are performed by a processor operatively coupled to the latch.

7. The method of claim 6, wherein the light source is in the lid.

8. The method of claim 6, further comprising controlling the light source to produce different symbols for different events.

9. The method of claim 6, wherein the monitored event and the characteristic are stored in a database of the computer.

10. A method of producing a symbol light effect on an illuminable portion of a latch coupled to a lid of a portable computer, comprising:
    monitoring an event associated with the computer, wherein monitoring is performed by a processor of the computer; and
    associating the monitored event with an illumination characteristic;
    controlling at least one side firing LED based on the monitored event and illumination characteristic to indicate a status of the monitored event, the at least one side firing LED being positioned inside a housing of the latch, wherein the illuminable portion of the latch is a translucent insert having an outer surface visible to an end user of the portable computer and at least one side portion not directly viewable to the end user and arranged to receive light directly from the at least one side firing LED and wherein the at least one side firing LED produces enough illumination to emit a characteristic glow that emanates equally from the outer surface of the translucent insert.

11. The method of claim 10, wherein the monitored event and illumination characteristic are stored in a database of the computer.

12. The method of claim 11, wherein the illumination characteristic may be customized by a user.

13. The method of claim 10, wherein the monitored event is related to the portable computer or a device attached to the portable computer.

14. The method of claim 10, further comprising controlling the light source to produce different symbol light effects for different events.

15. A method of producing a symbol light effect on an illuminable portion of a latch coupled to a lid of a portable computer, comprising:
    monitoring an event associated with the computer, wherein monitoring is performed by a processor of the computer; and
    associating the monitored event with an illumination characteristic;
    controlling at least one side firing LED based on the monitored event and illumination characteristic to indicate a status of the monitored event, wherein the at least one side firing LED is arranged to produce different colors of a color spectrum allowing the portable computer to change a color of the illuminable portion according to specific tasks being performed in the portable computer.

16. The method of claim 15, wherein the illuminable portion is a translucent portion of the housing of the latch.

17. The method of claim 15, wherein the at least one side firing LED is configured to produce different light effects for different events monitored by the processor in the computer.

18. The method of claim 15, wherein the monitored event and illumination characteristic are stored in a database of the computer.

19. The method of claim 15, further comprising controlling the light source to produce different symbols for different events.

* * * * *

UNITED STATES PATENT AND TRADEMARK OFFICE
CERTIFICATE OF CORRECTION

| | | |
|---|---|---|
| PATENT NO. | : 8,035,481 B2 | Page 1 of 1 |
| APPLICATION NO. | : 12/499691 | |
| DATED | : October 11, 2011 | |
| INVENTOR(S) | : Christoph H. Krah | |

It is certified that error appears in the above-identified patent and that said Letters Patent is hereby corrected as shown below:

In the Claims

Col. 20, Line 26-29, Claim 14 currently reads as follows:
14. the method of claim 10, further comprising controlling the light source to produce different symbol light effects for different events.

Please correct Claim 14 to read as follows:
14. the method of claim 10, further comprising controlling the at least one side firing LED to produce different symbol light effects for different events.

Col. 20, Line 45-46, Claim 16 currently reads as follows:
16. the method of claim 15, wherein the illuminable portion is a translucent portion of the housing of the latch.

Please correct Claim 16 to read as follows:
16. the method of claim 15, wherein the illuminable portion is a translucent portion of a housing of the latch.

Signed and Sealed this
Seventh Day of October, 2014

Michelle K. Lee
*Deputy Director of the United States Patent and Trademark Office*